US012585688B2

(12) United States Patent
Zu et al.

(10) Patent No.: US 12,585,688 B2
(45) Date of Patent: Mar. 24, 2026

(54) SENSITIVE DATA IDENTIFICATION METHOD AND APPARATUS, DEVICE, AND COMPUTER STORAGE MEDIUM

(71) Applicant: CHINA UNIONPAY CO., LTD., Shanghai (CN)

(72) Inventors: Lijun Zu, Shanghai (CN); Wenyu Qi, Shanghai (CN); Xiaohua Men, Shanghai (CN); Xiaoxia Zhao, Shanghai (CN); Sijie He, Shanghai (CN); Wenzhe Xue, Shanghai (CN); Jiawei Ye, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 19/125,098

(22) PCT Filed: Nov. 16, 2023

(86) PCT No.: PCT/CN2023/131993
§ 371 (c)(1),
(2) Date: Apr. 28, 2025

(87) PCT Pub. No.: WO2024/109619
PCT Pub. Date: May 30, 2024

(65) Prior Publication Data
US 2026/0010559 A1     Jan. 8, 2026

(30) Foreign Application Priority Data

Nov. 22, 2022    (CN) .......................... 202211463738.2

(51) Int. Cl.
*G06F 16/35*     (2025.01)
*G06F 16/2455*     (2019.01)
(Continued)

(52) U.S. Cl.
CPC ........ *G06F 16/35* (2019.01); *G06F 16/24564* (2019.01); *G06F 16/3344* (2019.01);
(Continued)

(58) Field of Classification Search
None
See application file for complete search history.

(56) References Cited

U.S. PATENT DOCUMENTS 11,372,742  B1     6/2022   Sawant et al.
11,531,703  B2 *  12/2022   Chen ..................... G06F 16/367
(Continued)

FOREIGN PATENT DOCUMENTS

CN          110866108  A      3/2020
CN          111241133  A      6/2020
CN          116150201  A      5/2023

OTHER PUBLICATIONS

English translation of International Search Report and Written Opinion issued in PCT/CN2023/131993, mailed Jan. 31, 2024.

*Primary Examiner* — Richard L Bowen
(74) *Attorney, Agent, or Firm* — Meunier Carlin & Curfman LLC

(57)     ABSTRACT

The present application discloses a sensitive data identification method and apparatus, a device, and a computer storage medium. A text mining technology is used to mine a plurality of sensitive data rules from a data security specification file of a target industry to form a sensitive data rule base, the rule base is continuously augmented by using technologies such as NLP and NER, and after data to be identified of the target industry is obtained, a sensitivity class and a sensitivity level of the data to be identified can be identified by matching the sensitive data rules in the sensitive data rule base corresponding to the target industry with the data to be identified.

8 Claims, 8 Drawing Sheets

(51) Int. Cl.

| | |
|---|---|
| *G06F 16/334* | (2025.01) |
| *G06F 21/62* | (2013.01) |
| *G06F 40/242* | (2020.01) |
| *G06F 40/247* | (2020.01) |
| *G06F 40/295* | (2020.01) |
| *G06F 40/30* | (2020.01) |

(52) U.S. Cl.
CPC ........ *G06F 21/6245* (2013.01); *G06F 40/242* (2020.01); *G06F 40/247* (2020.01); *G06F 40/295* (2020.01); *G06F 40/30* (2020.01); *G06F 2216/03* (2013.01)

(56) References Cited

U.S. PATENT DOCUMENTS

| | | | |
|---|---|---|---|
| 2009/0254572 A1 | 10/2009 | Redlich et al. | |
| 2014/0101784 A1 | 4/2014 | Shukla et al. | |
| 2020/0159771 A1* | 5/2020 | Dain | G06F 16/24573 |
| 2024/0069787 A1* | 2/2024 | Kannan | G06F 3/0604 |

* cited by examiner

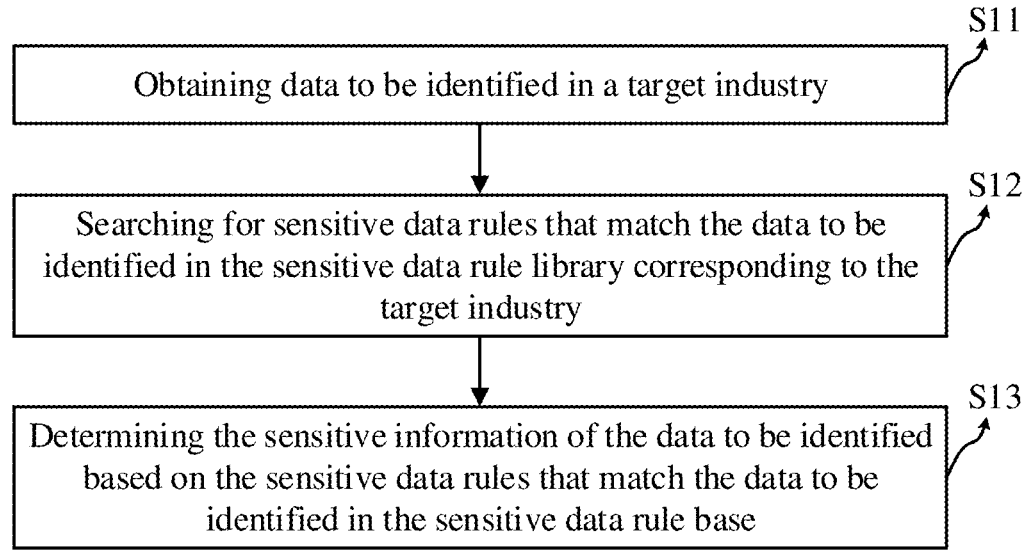

Obtaining data to be identified in a target industry — S11

Searching for sensitive data rules that match the data to be identified in the sensitive data rule library corresponding to the target industry — S12

Determining the sensitive information of the data to be identified based on the sensitive data rules that match the data to be identified in the sensitive data rule base — S13

FIG. 1

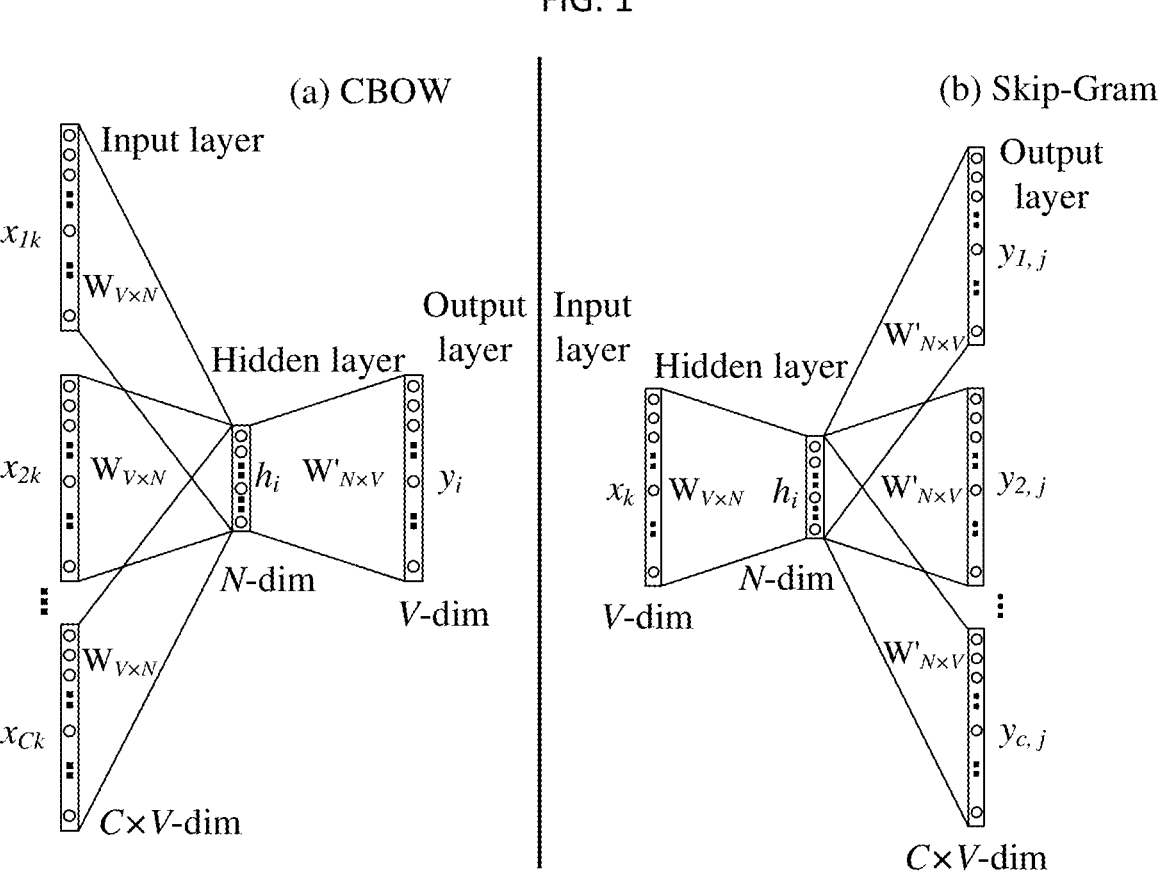

(a) CBOW                    (b) Skip-Gram

FIG. 2

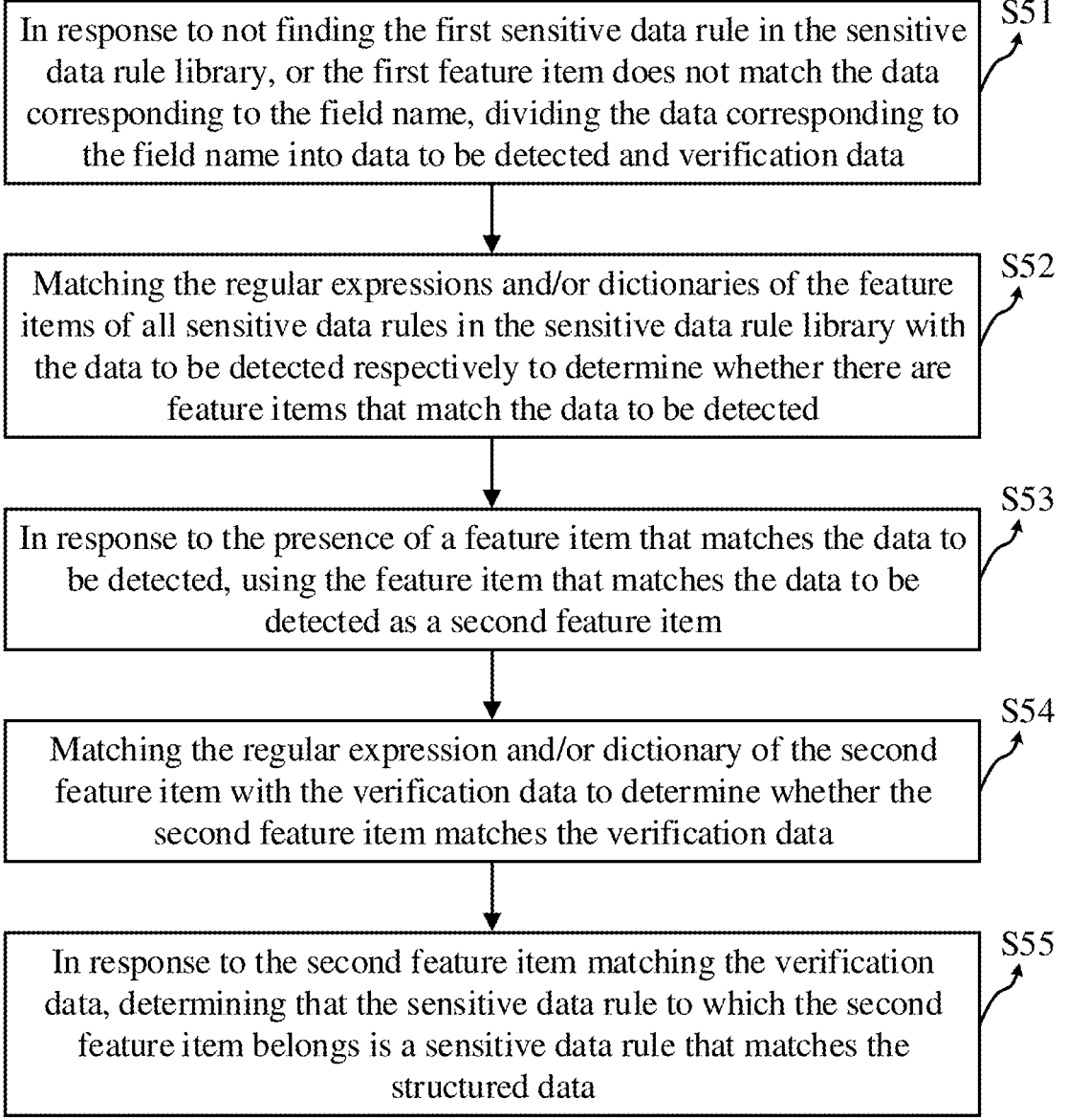

In response to not finding the first sensitive data rule in the sensitive data rule library, or the first feature item does not match the data corresponding to the field name, dividing the data corresponding to the field name into data to be detected and verification data          S51

Matching the regular expressions and/or dictionaries of the feature items of all sensitive data rules in the sensitive data rule library with the data to be detected respectively to determine whether there are feature items that match the data to be detected          S52

In response to the presence of a feature item that matches the data to be detected, using the feature item that matches the data to be detected as a second feature item          S53

Matching the regular expression and/or dictionary of the second feature item with the verification data to determine whether the second feature item matches the verification data          S54

In response to the second feature item matching the verification data, determining that the sensitive data rule to which the second feature item belongs is a sensitive data rule that matches the structured data          S55

FIG. 5

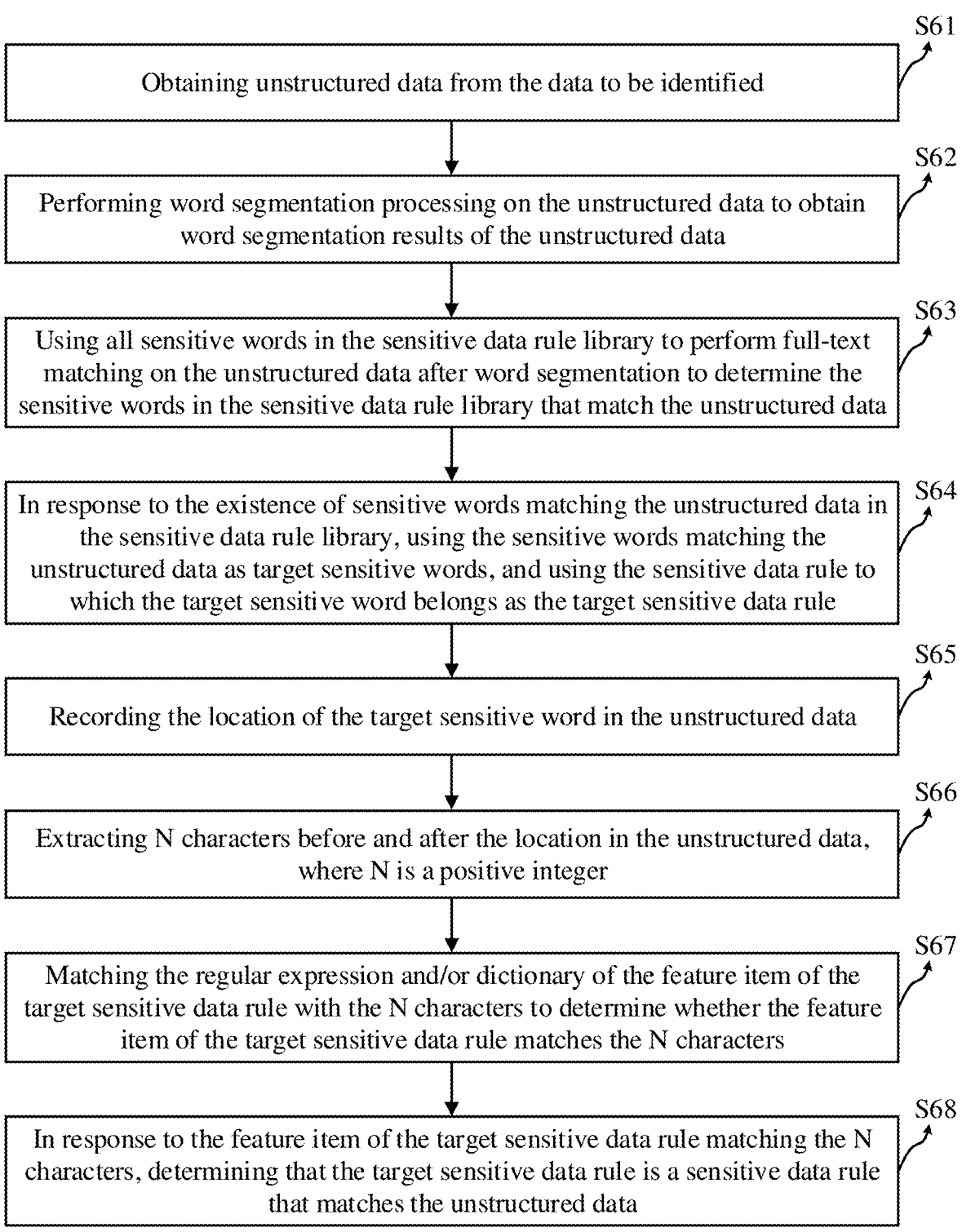

S61

Obtaining unstructured data from the data to be identified

S62

Performing word segmentation processing on the unstructured data to obtain word segmentation results of the unstructured data

S63

Using all sensitive words in the sensitive data rule library to perform full-text matching on the unstructured data after word segmentation to determine the sensitive words in the sensitive data rule library that match the unstructured data

S64

In response to the existence of sensitive words matching the unstructured data in the sensitive data rule library, using the sensitive words matching the unstructured data as target sensitive words, and using the sensitive data rule to which the target sensitive word belongs as the target sensitive data rule

S65

Recording the location of the target sensitive word in the unstructured data

S66

Extracting N characters before and after the location in the unstructured data, where N is a positive integer

S67

Matching the regular expression and/or dictionary of the feature item of the target sensitive data rule with the N characters to determine whether the feature item of the target sensitive data rule matches the N characters

S68

In response to the feature item of the target sensitive data rule matching the N characters, determining that the target sensitive data rule is a sensitive data rule that matches the unstructured data

Using the dictionary of all feature items in the sensitive data rule library and/or the trained named-entity recognition model to identify feature items in the unstructured data as the third feature items

S72

Searching the sensitive data rules containing the third feature item from the sensitive data rule library as the third sensitive data rules

S73

In response to finding the third sensitive data rules from the sensitive data rule library, determining a sensitive data rule that matches the unstructured data from the third sensitive data rules

FIG. 7

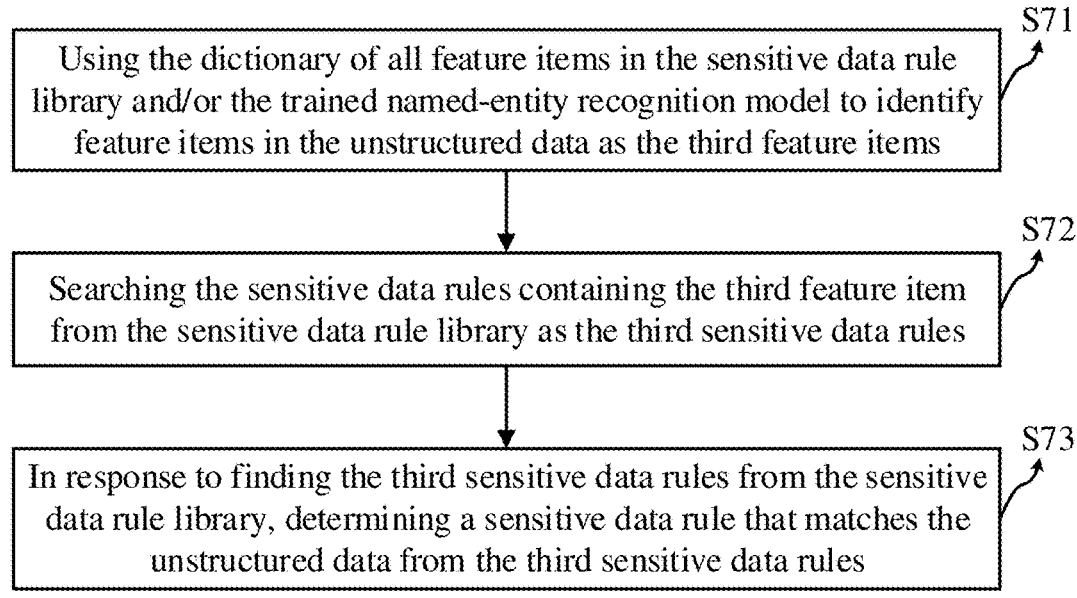

$B_b=B\text{-}brand$
$I_b=I\text{-}brand$
$B_p=B\text{-}product$
$I_p=I\text{-}product$
$B_c=B\text{-}color$

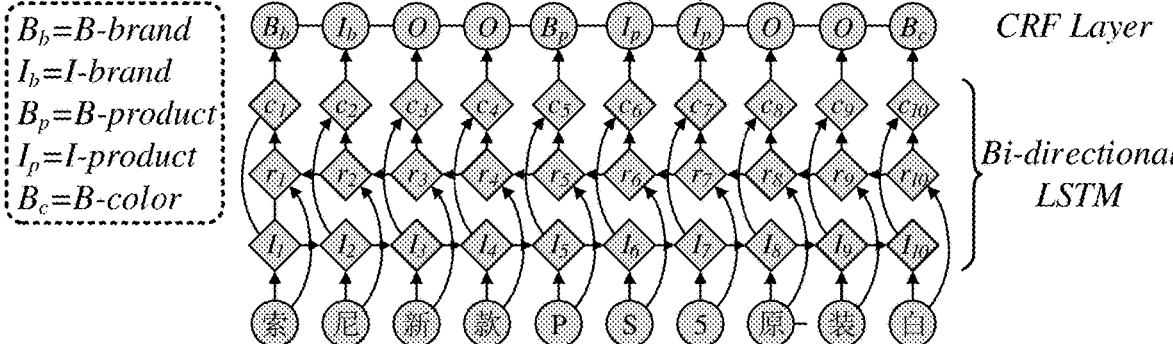

SENSITIVE DATA IDENTIFICATION METHOD AND APPARATUS, DEVICE, AND COMPUTER STORAGE MEDIUM

CROSS-REFERENCE TO RELATED APPLICATIONS

This application is a national stage of International Application No. PCT/CN2023/131993 filed on Nov. 16, 2023, which claims priority to Chinese patent application 202211463738.2, filed on Nov. 22, 2022, entitled "Sensitive Data Identification Method, Device, Equipment and Computer Storage Medium", the entire contents of which are incorporated herein by reference.

TECHNICAL FIELD

The present disclosure belongs to the field of data processing technology, and in particular, relates to a sensitive data identification method and apparatus, device, and computer storage medium.

BACKGROUND

At present, in many industries, the supervision of data security is gradually increasing, and relevant industry data security specification files are gradually being issued. How to technically ensure that sensitive data is legally and compliantly identified and processed is the key research content of data security.

The existing identification of sensitive data mainly adopts a customized approach. According to the needs of enterprises, experts formulate corresponding sensitive word libraries, identification rules, identification models and other data products based on professional knowledge and historical data.

SUMMARY

In the first aspect, the present disclosure provide a sensitive data identification method, including:

obtaining data to be identified of a target industry;

searching for a sensitive data rule matching the data to be identified in a sensitive data rule library corresponding to the target industry, wherein the sensitive data rule library includes a plurality of sensitive data rules mined from a data security specification file of the target industry by using a text mining technology;

determining sensitive information of the data to be identified according to the sensitive data rule matching the data to be identified in the sensitive data rule library.

In some possible embodiments, before the searching for the sensitive data rule matching the data to be identified in the sensitive data rule library corresponding to the target industry, the method further includes:

obtaining the data security specification file of the target industry;

mining the plurality of sensitive data rules from the data security specification file by using the text mining technology, wherein each of the sensitive data rules includes parameter values of following parameters: a rule name, a sensitive classification, a sensitivity level, a feature item, a sensitive word and a keyword; the feature item includes following parameter values: a feature item name, a regular expression for identifying the feature item, a dictionary and a checksum;

combining the plurality of sensitive data rules into the sensitive data rule library corresponding to the target industry;

combining the parameter values included by feature items in the sensitive data rule library into a feature item library corresponding to the sensitive data rule library.

In some possible embodiments, before the searching for the sensitive data rule matching the data to be identified in the sensitive data rule library corresponding to the target industry, the method further includes:

for each sensitive data rule in the sensitive data rule library, augmenting parameter values of the keyword and the sensitive word in the each sensitive data rule to obtain synonyms of the parameter values, and add the synonyms to the keyword and the sensitive word in the each sensitive data rule; and/or, for each sensitive data rule in the sensitive data rule library, augmenting parameter values of the parameters included by the feature item in the each sensitive data rule to obtain synonyms and/or congeneric words of the parameter values, and combining the synonyms and/or the congeneric words into a dictionary of the feature item.

In some possible embodiments, the searching for the sensitive data rule matching the data to be identified in the sensitive data rule library corresponding to the target industry, includes:

obtaining structured data from the data to be identified;

extracting a field name to be identified in the structured data and data corresponding to the field name;

searching for a sensitive data rule whose keyword matches the field name from the sensitive data rule library as a first sensitive data rule;

in response to finding the first sensitive data rule from the sensitive data rule library, determining whether a first feature item matches the data corresponding to the field name according to a regular expression and/or a dictionary preset in the first feature item, wherein the first feature item is a feature item of the first sensitive data rule;

in response to the first feature item matching the data corresponding to the field name, determining that the first sensitive data rule is a sensitive data rule matching the structured data.

In some possible embodiments, the searching for the sensitive data rule matching the data to be identified in the sensitive data rule library corresponding to the target industry, further includes:

in response to not finding the first sensitive data rule from the sensitive data rule library, or the first feature item not matching the data corresponding to the field name, dividing the data corresponding to the field name into data to be detected and verification data;

comparing regular expressions and/or dictionaries of feature items of all sensitive data rules in the sensitive data rule library with the data to be detected respectively to determine whether there is a feature item matching the data to be detected;

in response to a presence of a feature item matching the data to be detected, taking the feature item matching the data to be detected as a second feature item;

comparing a regular expression and/or a dictionary of the second feature item with the verification data to determine whether the second feature item matches the verification data;

in response to the second feature item matching the verification data, determining that the sensitive data rule to which the second feature item belongs is the sensitive data rule matching the structured data.

In some possible embodiments, the determining the sensitive information of the data to be identified according to the sensitive data rule matching the data to be identified in the sensitive data rule library, includes:

in response to there being only one sensitive data rule matching the structured data in the sensitive data rule library, using the sensitive classification and the sensitivity level of the sensitive data rule matching the structured data as the sensitive classification and the sensitivity level of the structured data;

in response to there being a plurality of sensitive data rules matching the structured data in the sensitive data rule library, using the sensitive classification and the sensitivity level of a sensitive data rule with a highest sensitivity level among the sensitive data rules matching the structured data as the sensitive classification and the sensitivity level of the structured data.

In some possible embodiments, the searching for the sensitive data rule matching the data to be identified in the sensitive data rule library corresponding to the target industry, includes:

obtaining unstructured data from the data to be identified;

performing a word segmentation processing on the unstructured data to obtain a word segmentation result of the unstructured data;

performing a full-text matching on the unstructured data after the word segmentation processing by using all sensitive words in the sensitive data rule library to determine a sensitive word matching the unstructured data in the sensitive data rule library;

in response to the sensitive word matching the unstructured data in the sensitive data rule library, using the sensitive word matching the unstructured data as a target sensitive word, and using the sensitive data rule to which the target sensitive word belongs as a target sensitive data rule;

recording a location of the target sensitive word in the unstructured data;

extracting N characters located before and after the location in the unstructured data, wherein N is a positive integer;

comparing a regular expression and/or a dictionary of a feature item of the target sensitive data rule with the N characters to determine whether the feature item of the target sensitive data rule matches the N characters;

in response to the feature item of the target sensitive data rule matching the N characters, determining that the target sensitive data rule is a sensitive data rule matching the unstructured data. In some possible embodiments, the searching for the sensitive data rule matching the data to be identified in the sensitive data rule library corresponding to the target industry, includes:

using dictionaries of all feature items in the sensitive data rule library and/or a trained named-entity recognition model to identify a feature item in the unstructured data as a third feature item;

searching a sensitive data rule including the third feature item from the sensitive data rule library as a third sensitive data rule;

in response to finding the third sensitive data rule from the sensitive data rule library, determining a sensitive data rule matching the unstructured data from the third sensitive data rule.

In some possible embodiments, the determining the sensitive data rule matching the unstructured data from the third sensitive data rule, includes:

in response to a presence of a plurality of third sensitive data rules in the sensitive data rule library, performing a semantic classification processing on the unstructured data to obtain the sensitive classification to which the unstructured data belongs;

determining that among the plurality of third sensitive data rules, a sensitive data rule whose sensitive classification is consistent with the sensitive classification to which the unstructured data belongs is the sensitive data rule matching the unstructured data.

In some possible embodiments, the determining the sensitive information of the data to be identified according to the sensitive data rule matching the data to be identified in the sensitive data rule library, includes:

in response to there being only one sensitive data rule matching the unstructured data in the sensitive data rule library, using the sensitive classification and the sensitivity level of the sensitive data rule matching the unstructured data as the sensitive classification and the sensitivity level of the unstructured data;

in response to there being a plurality of sensitive data rules matching the unstructured data in the sensitive data rule library, using the sensitive classification and the sensitivity level of a sensitive data rule with a highest sensitivity level among the plurality of sensitive data rules matching the unstructured data as the sensitive classification and the sensitivity level of the unstructured data.

In the second aspect, the present disclosure further provides a sensitive data identification device, including:

a data obtaining module configured to obtain data to be identified of a target industry;

a rule search module configured to search for a sensitive data rule matching the data to be identified in a sensitive data rule library corresponding to the target industry, wherein the sensitive data rule library includes a plurality of sensitive data rules mined from a data security specification file of the target industry by using a text mining technology;

a sensitive information determination module configured to determine sensitive information of the data to be identified according to the sensitive data rule matching the data to be identified in the sensitive data rule library.

In the third aspect, the present disclosure further provides an electronic device, including: a processor and a memory storing computer program instructions;

based on that the processor executes the computer program instructions, the sensitive data identification method as described in the first aspect is implemented.

In the fourth aspect, the present disclosure further provides a computer-readable storage medium, including computer program instructions stored thereon, wherein based on that the computer program instructions are executed by a processor, the sensitive data identification method as described in in the first aspect is implemented.

In the fifth aspect, the present disclosure further provides a computer program product, based on instructions in the computer program product are executed by a processor of an electronic device, the electronic device is caused to implement the sensitive data identification method as described in the first aspect.

BRIEF DESCRIPTION OF FIGURES

In order to more clearly illustrate the technical solution of the embodiments of the present disclosure, the following is a brief introduction to the drawings required for use in the embodiments of the present disclosure. For ordinary technicians in this field, other drawings can be obtained based on these drawings without any creative work.

FIG. 1 is a flowchart of a sensitive data identification method provided by an embodiment of the present disclosure;

FIG. 2 is a schematic diagram of a word2vec model provided by an embodiment of the present disclosure;

FIG. 5 is a flowchart of a specific implementation method of step S12 provided in another embodiment of the present disclosure;

FIG. 6 is a flowchart of a specific implementation method of step S12 provided in another embodiment of the present disclosure;

FIG. 7 is a flowchart of a specific implementation method of step S12 provided in yet another embodiment of the present disclosure;

FIG. 8 is a schematic diagram of a named-entity recognition model provided by an embodiment of the present disclosure;

DETAILED DESCRIPTION

Figure 3:
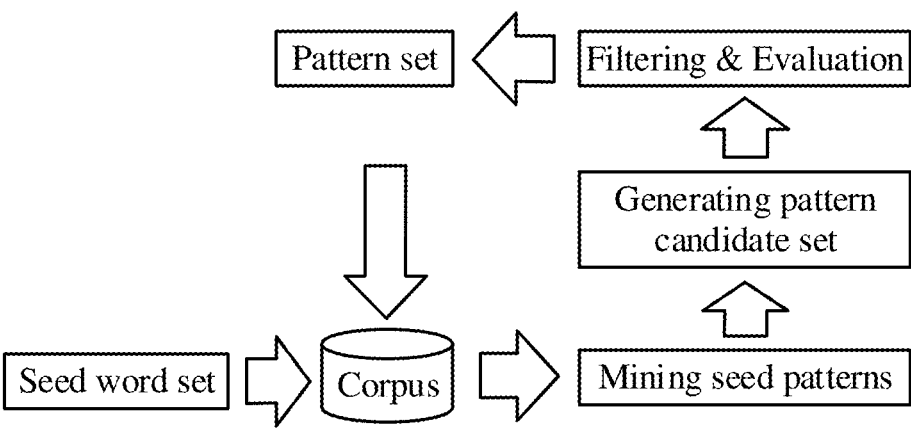
FIG. 3 is a flowchart of a dictionary augmentation solution based on bootstrapping provided by an embodiment of the present disclosure.

The features and exemplary embodiments of various aspects of the present disclosure will be described in detail below. In order to make the purpose, technical solutions and advantages of the present disclosure clearer, the present disclosure will be further described in detail below in conjunction with the accompanying drawings and specific embodiments. It should be understood that the specific embodiments described herein are only intended to explain the present disclosure, rather than to limit the present disclosure. For those skilled in the art, the present disclosure can be implemented without the need for some of these specific details. The following description of the embodiments is only to provide a better understanding of the present disclosure by illustrating the examples of the present disclosure.

It should be noted that, in this disclosure, relational terms such as first and second, etc. are only used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the statement "include . . . " do not exclude the existence of other identical elements in the process, method, article or device including the elements.

Taking the financial industry as an example, with the continuous deepening of open banking practices, data security has become a part of the open banking ecosystem that needs to be strengthened. How to technically ensure that sensitive data is legally and compliantly identified and processed in the process of opening and sharing with all parties in the ecosystem (bank side, scenario side) is an important part of the security of open banking scenarios. According to the survey of the financial industry, most small and medium-sized banks and financial institutions on the open banking scenario side are not yet perfect in data standards and data management, and the technical capabilities for effective identification and processing of sensitive data are relatively weak, which is the main hidden danger to data security in the open ecosystem. In addition, the data products currently used for sensitive data detection on the market are mainly customized data products for enterprise needs. There are no general, industry-level technical tools to help enterprises automatically identify and process sensitive data products under industry standard requirements.

The existing sensitive data identification scheme mainly involves manually presetting sensitive word libraries and identification rules, and using regular expressions, scripting languages, etc. to determine whether sensitive data exists in structured data records. Alternatively, sensitive data is determined by manually pre-defining security goals and influencing factors, and sensitive data sets under different categories are constructed using classification learning models. Then, deep learning is used to train sensitive data identification models to identify unstructured sensitive data with semantic features. Alternatively, based on the preset sensitive words, the associations between words in the corpus are analyzed to mine the associated words and association rules of sensitive words, and the security policies corresponding to sensitive words are updated. At the same time, the full-text search engine framework is used to improve the efficiency of data matching.

In general, existing technical solutions have two major limitations: First, sensitive words and sensitive rules need to be manually set in advance. Due to the limitations of expert knowledge and historical data, the number of sensitive rules is small and the scalability is poor. Due to the lack of a more universal sensitive data rule library, it is impossible to guarantee full compliance with industry standards. Second, existing technical methods are mainly used to determine whether sensitive data exists. On the one hand, they cannot handle scenarios where the data field contains multiple categories and levels of sensitive words. On the other hand, when the amount of data to be identified is large, the system overhead is large, and the recognition efficiency and accuracy will be significantly reduced.

In view of this, the present disclosure proposes a universal, industry-level sensitive data identification method and device, which can help enterprises automatically identify and process sensitive data under industry standard requirements.

The sensitive data identification method provided in the embodiment of the present disclosure can be applied to various industries that require sensitive information identification, such as the financial industry, to identify sensitive data therein.

Referring to FIG. 1, which is a flow chart of a sensitive data identification method provided in an embodiment of the present disclosure, as shown in FIG. 1, the sensitive data identification method provided in this embodiment may include the following steps.

S11. Obtaining data to be identified in a target industry.

The target industry may be any industry that needs to perform sensitive data identification, such as the financial industry, etc. The data to be identified in the target industry is the data that needs to be identified by the sensitive data identification in the target industry.

The sensitive data identification method provided in this embodiment can be executed by a sensitive data identification system.

In one example, the target industry's data to be identified can be stored in a sensitive data identification system, so that the data to be identified can be directly obtained from the system. The data to be identified can be input by a user into the sensitive data identification system for storage, or can be automatically obtained and stored by the sensitive data identification system in a server or cloud.

S12. Searching for sensitive data rules that match the data to be identified in the sensitive data rule library corresponding to the target industry; the sensitive data rule library includes multiple sensitive data rules mined from the data security specification files of the target industry using text mining technology.

In this embodiment, a text mining technology can be used in advance to mine multiple sensitive data rules from the data security specification file of the target industry to form a sensitive data rule library corresponding to the target industry. In this way, after obtaining the data to be identified, sensitive data identification can be performed directly on the data to be identified according to the sensitive data rule library corresponding to the target industry. Among them, the data security specification file of the target industry refers to the unified technical requirements formulated for data security within the scope of the target industry, which is an industry standard that must be followed by enterprises or individuals within the scope of the target industry. Sensitive data rules are rules used to identify sensitive data. For any data, if the data matches the sensitive data rules, it means that the data contains sensitive data.

In one example, when searching for sensitive data rules that match the data to be identified in the sensitive data rule library corresponding to the target industry, each sensitive data rule in the sensitive data rule library can be matched with the data to be identified respectively, so as to find sensitive data rules that match the data to be identified.

S13. Determining the sensitive information of the data to be identified based on the sensitive data rules that match the data to be identified in the sensitive data rule base. If a sensitive data rule that matches the data to be identified is found in the sensitive data rule base, it means that sensitive data exists in the data to be identified. At this time, the sensitive information of the data to be identified can be further determined based on the found sensitive data rules. The sensitive information refers to information related to sensitive data, for example, it may include sensitive classification, sensitivity level, etc. Among them, the sensitive classification refers to the classification to which sensitive data belongs, and the sensitivity level refers to the sensitivity level of sensitive data.

The present embodiment provides a sensitive data identification method, which uses text mining technology to mine multiple sensitive data rules from the data security specification file of the target industry to form a sensitive data rule library. After obtaining the data to be identified in the target industry, the sensitive data rule library corresponding to the target industry is searched for sensitive data rules that match the data to be identified, and the sensitive information of the data to be identified is determined according to the matching sensitive data rules. According to the embodiment of the present disclosure, the sensitive data rule library corresponding to the industry obtained by text mining the data security specification file in the industry is applicable to all enterprises and individuals in the industry. Compared with artificially formulated enterprise-level data products, it has a wider scope of application, universality and broader application prospects, and higher compliance, making industry standards technically executable.

In some embodiments, before executing the above step S12, the sensitive data rule library corresponding to the target industry may be set in the following manner:

obtaining data security specification files of the target industry;

using the text mining technology to mine multiple sensitive data rules from the obtained data security specification files, each sensitive data rule includes the values of the following parameters: rule name, sensitive classification, sensitivity level, feature item, sensitive word and keyword; each feature item specifically includes the values of the following parameters: feature item name, regular expression for identifying the feature item, dictionary and checksum;

combining the mined sensitive data rules into a sensitive data rule library corresponding to the target industry.

In one example, when obtaining the data security specification files of the target industry, the corresponding data security specification files can be manually uploaded through the human-computer interaction interface, or the corresponding data security specification files can be manually selected from the local or server to obtain the data security specification files of the target industry. In addition, the corresponding data security specification files can also be automatically obtained from the network through retrieval technology.

After obtaining the data security specification files of the target industry, when performing text mining, setting the parameter items that need to be mined, and then using the existing mature text mining algorithm based on the set parameters to mine the corresponding sensitive data rules from the data security specification files. In this way, each mined sensitive data rule contains the value of each parameter item. The set parameter items include: rule name, sensitive classification, sensitivity level, feature item, sensitive word and keyword. In addition to the above parameter items, it can also include parameter items such as rule number. Specifically, the parameter items can be set according to actual needs. Among them, the value of each parameter item can include text (such as words, characters, sentences, etc.), numbers, characters and other content.

In an example, a database table as shown in Table 1 below may be pre-set, and the mined sensitive data rules may be filled into the database table respectively, thereby forming a sensitive rule database.

TABLE 1

| Rule number | Rule name | Sensitive classification | Sensitivity level | Feature item | Sensitive word | Keyword |
| --- | --- | --- | --- | --- | --- | --- |

As shown in Table 1, the sensitive data rule library table may include the following parameter items: "Rule number", "Rule name", "Sensitive classification", "Sensitivity level", "Feature item", "Sensitive word" and "Keyword". When filling the sensitive data rules into the database table, each parameter value included in the sensitive data rules may be added to the corresponding parameter item. All parameter values in the same sensitive data rule may be filled into the same row, and parameter values in different sensitive data rules may be filled into different rows. The database table filled with multiple sensitive data rules is used as a sensitive rule database.

By setting up a sensitive data rule library table, all sensitive data rules can be stored in a unified format for easy management and use.

In one example, taking the target industry as the financial industry, its corresponding data security specification files may include the "Guidelines for Data Security Grading of Financial Data Security" (JR/T 0197-2020) and "Technical Specifications for the Protection of Personal Financial Information" issued by the People's Bank of China. When mining sensitive data rules based on the above data security specification files, the parameter values of "Rule name", "Sensitive classification" and "Sensitive level" can be obtained from Appendix A of the "Guidelines for Data Security Grading of Financial Data" using text mining technology. Taking the rule name as an example, the rule name can be extracted by text parsing-word segmentation-based on sentence structure and part of speech, and the "four-level subclass" in Appendix A is used as the "sensitive classification"; "Feature item" is the feature of the rule, such as the rules "enrollment date", "graduation date" and "certificate effective date" have the common feature item "date"; "keywords" and "sensitive words" are used to locate sensitive rules in structured data and unstructured data respectively. For example, the feature item of the "home address" rule is "address", the keyword is "home address\nhome address", and the sensitive word is "home\naddress\naddress\nresidence".

The feature items in the sensitive data rule base can be described by regular expressions, dictionaries, and check-sums. Based on this, each feature item specifically includes the values of the following parameter items: feature item name, regular expression for identifying the feature item, dictionary, and checksum, etc. For ease of use, a feature item library corresponding to the sensitive data rule base can be formed based on the values of the parameter items included in multiple feature items in the sensitive data rule base.

In one example, a feature library table as shown in Table 2 below may be constructed, and the values of parameter items included in a plurality of feature items may be respectively filled into the database table, thereby forming a feature item library.

TABLE 2

| Feature number | Feature item name | Sensitive classification | Regular expression | Feature item | Feature dictionary | Check sum |
|---|---|---|---|---|---|---|

As shown in Table 2, the feature library table may include the following parameter items: "feature number", "feature item name", "regular expression", "feature dictionary" and "checksum". Among them, "regular expression" describes the format rule of the feature item; "feature dictionary" includes dictionaries obtained through augmentation and named-entity recognition models, including institution name dictionaries, bank dictionaries, etc.; "checksum" is a Boolean value used to indicate whether the feature item has a public verification function, such as ID card verification.

By setting up the feature library table, the contents of all feature items can be stored in a unified format for easy management and use.

Through this embodiment, each sensitive data rule mined by text mining technology includes rule name, sensitive classification, sensitivity level, feature item, sensitive word and keyword, and each feature item further includes corresponding regular expression, feature dictionary and check-sum. Based on sensitive data rules, sensitive data and its sensitive classification and sensitivity level are identified, so that sensitive data in the data to be identified can be effectively identified and classified according to industry specifications.

In some embodiments, it is considered that some parameter values in the sensitive data rules may be named differently in different data, and there is a problem of non-standard naming. For example, there may be fields with the same meaning, and the naming method used in the data security specification text may be different from the naming method used for the data to be identified. Therefore, if the parameter values mined from the data security specification text are directly used for sensitive data identification, some sensitive data may not be accurately identified, resulting in a low recognition accuracy. Therefore, in order to solve this problem, the embodiment of the present disclosure also proposes to use automatic augmentation technology to augment the parameter values in the sensitive data, so that the sensitive data rule library can be continuously and dynamically optimized to improve the recognition accuracy. Accordingly, before executing the above step S12, the following steps can also be performed first:

for each sensitive data rule in the sensitive data rule library, performing augmentation processing on the parameter values of the keywords and sensitive words in the sensitive data rule to obtain synonyms of the parameter values, and adding the synonyms to the keywords and sensitive words in the sensitive data rule; and/or, for each sensitive data rule in the sensitive data rule library, performing augmentation processing on the parameter value of the feature item in the sensitive data rule to obtain synonyms and/or congeneric words of the parameter value, and combining the synonyms and/or congeneric words into a dictionary of the feature item.

Among them, the parameter values of keywords and the parameter values of feature items can both include words.

NLP (Natural Language Processing) technology can be used to augment the parameter values of keywords, sensitive words and/or feature items. For example, based on a variety of augmentation schemes such as synonym libraries, word2vec and/or bootstrapping, it is possible to solve the problem of non-standard naming of synonyms such as "address" and "residence", congeneric words such as "Bank of China" and "Industrial Bank", and the same word such as "Agricultural Bank of China", "Agricultural Bank", and "abc", thereby improving the expansion capability of the rule library and the accuracy of identifying sensitive information.

In one example, if the same meaning has different expressions, it will bring certain difficulties to the accurate matching of sensitive data identification. In order to solve this problem, a thesaurus-based augmentation scheme can be used to augment the parameter values of "keywords" and/or "sensitive words". Taking the financial industry as an example, the thesaurus based on which it is augmented may include: (1) public financial data sets, such as field names in statistical data provided by the China Banking and Insurance Regulatory Commission and interface information disclosed by banks; (2) "Synonym Dictionary Extended Edition", which uses a tree structure to include nearly 70,000 entries and a 5-layer encoding mode, and uses a hierarchical algorithm and information content to perform similarity calculations to achieve synonym mining; (3) HowNet, which describes vocabulary characteristics by constructing a tree-like semantic original graph and a network-like semantic original meaning term graph, and uses semantic term similarity to perform vocabulary similarity calculations to achieve synonym mining. The above-mentioned thesaurus is only exemplary. In addition to the above-mentioned thesaurus, other thesaurus can also be used. The specific selection can be based on actual conditions, and no examples are given here. The above-mentioned augmentation method can augment the parameter values mined based on text with their corresponding synonyms. For example, if the parameter value of the mined "keyword" is salary, through augmentation, synonyms with the same meaning such as salary, remuneration, and wages can be obtained. By augmenting keywords and sensitive words, expressions of the same meaning can be added to the corresponding parameter items, thus improving the matching accuracy of keywords and sensitive words.

In one example, the augmentation scheme based on the word library is mainly used for the augmentation of synonyms, but ignores the context information of the corpus where the vocabulary is located. Based on this, the augmentation scheme of word2vec (word to vector) based on context information can also be used to expand "keywords", "sensitive words" and/or "feature items". When the augmentation scheme of word2vec based on context information is used for augmentation, the word vector library of the target industry can be trained, and the "keywords", "sensitive words" and/or "feature items" can be augmented using the similarity of word vectors. The word2vec model can use two training modes, CBOW (Continuous Bag-of-Words Model) and Skip-gram (Continuous Skip-gram Model, SG model) to measure context information. CBOW predicts the current word through the context; Skip-gram uses the current word to predict the context of the current word. Taking the financial industry as an example, through the augmentation of this scheme, various forms of bank names, APP (application) names, addresses, etc. can be identified, and a dictionary library can be formed to improve the recognition efficiency of the sensitive data rule library. As shown in FIG. 2, the CBOW model takes the contexts $X_1$, $X_2$, $X_c$ as input, and after being processed by the input layer, hidden layer and output layer in sequence, it outputs the intermediate words $P_j$ of the contexts $X_1$, $X_2$, $X_c$. The Skip-gram model takes the intermediate word $P_j$ as input, and after being processed by the input layer, hidden layer and output layer in sequence, it obtains the corresponding contexts $X_1$, $X_2$, $X_c$, etc., where $W_{V \times N}$ represents the input weight matrix, $W'_{V \times N}$ represents the output weight matrix, V-dim and N-dim represent the vector dimensions, and $h_j$ represents the output value of the hidden layer.

In one example, some professional "feature items" in sensitive data rules may have aliases. For example, in the financial industry, the name of the same bank may have a full name, an abbreviation, and an English name. Because in order to improve the recognition accuracy, it is also necessary to accumulate corresponding professional dictionaries for such "feature items". In this regard, a dictionary augmentation scheme based on the bootstrapping method can be adopted. As shown in FIG. 3, when the augmentation scheme (the dictionary augmentation scheme based on the bootstrapping method) is adopted for augmentation, a seed word set is first constructed, and then the occurrence patterns of the real name and alias in the network corpus are mined based on the seed word set to generate a pattern set, and then the pattern set is used to mine new real name and alias pairs in the corpus, thereby achieving the purpose of augmentation. The network corpus can be a corpus constructed by Wikipedia, Baidu Encyclopedia, etc.

In an embodiment of the present disclosure, automatic augmentation technology is used to augment the parameter values in the sensitive data rules, which consumes less manpower and time than manual augmentation. In some embodiments, data can generally be divided into structured data and unstructured data. The structured data is also called row data, which is data logically expressed and implemented by a two-dimensional table structure, strictly follows the data format and length specifications, and is mainly stored and managed through a relational database. In contrast to the structured data is unstructured data that is not suitable for being represented by a two-dimensional table in a database, including office documents of all formats, XML, HTML, various reports, pictures, audio, video information, etc. Based on this, in an embodiment of the present disclosure, different methods are used to find matching sensitive data rules for structured data and unstructured data in the data to be identified.

Next, the method of finding sensitive data rules that match structured data is first introduced.

Figure 4:
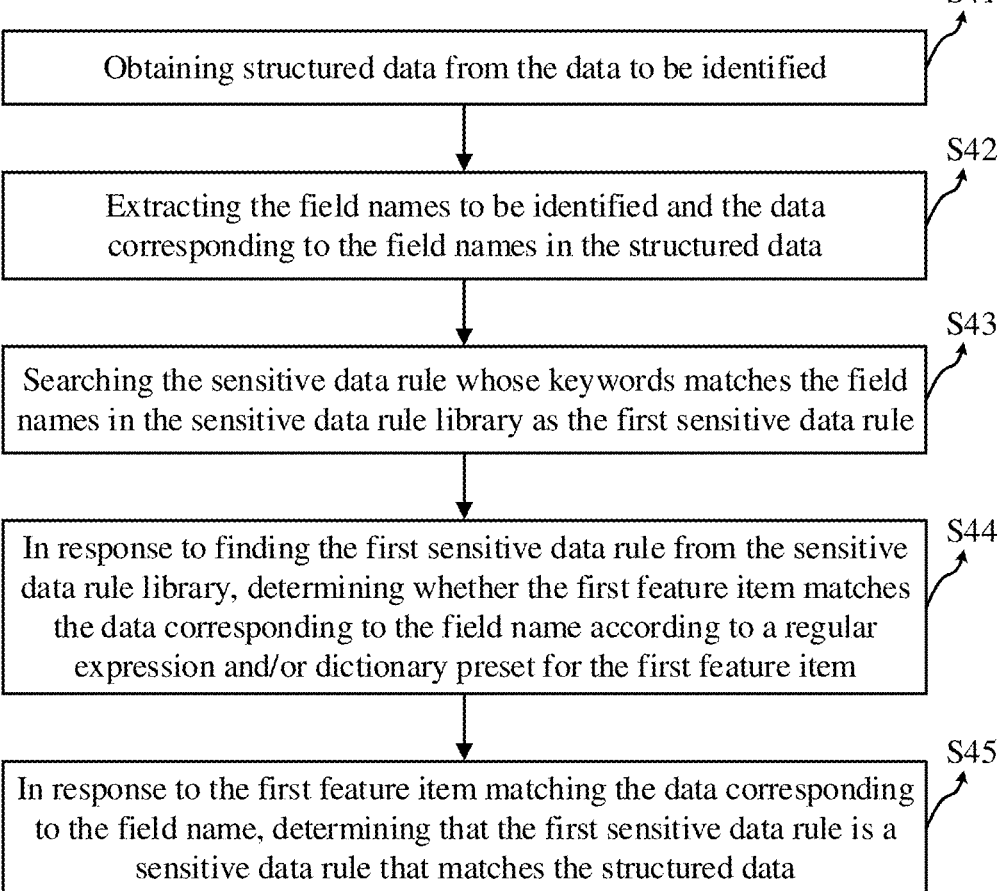
FIG. 4 is a flowchart of a specific implementation method of step S12 provided by an embodiment of the present disclosure.

As shown in FIG. 4, a specific implementation of the above step S12 may include the following steps S41 to S45.

S41. Obtaining structured data from the data to be identified.

In one example, data logically expressed and implemented by a two-dimensional table structure in the data to be identified is extracted as structured data.

S42. Extracting the field names to be identified and the data corresponding to the field names in the structured data.

The field name refers to the identifier of each column in the structured data, that is, the column name.

In one example, in the sensitive data identification system, at least one field name may be preset, based on which field names and data corresponding to the field names that are consistent with the preset field names may be extracted from the structured data as the field names to be identified and the data corresponding to the field names. The preset field names may be set according to actual needs.

S43. Searching the sensitive data rule whose keywords matches the field names in the sensitive data rule library as the first sensitive data rule.

When searching for the first sensitive data rule, all values contained in the keyword of each sensitive data rule in the sensitive data rule library can be matched with the field name to determine whether there is a value consistent with the field name. The sensitive data rule whose keyword contains a value consistent with the field name is taken as the first sensitive data rule matching the field name.

S44. In response to finding the first sensitive data rule from the sensitive data rule library, determining whether the first feature item matches the data corresponding to the field name according to a regular expression and/or dictionary preset for the first feature item.

Among them, the first feature item is the feature item of the first sensitive data rule.

In one example, the regular expression and/or dictionary of the first feature item may be obtained from a preset feature item library.

In one example, when determining whether the first feature item matches the data corresponding to the field name based on the regular expression and/or dictionary of the first feature item, the regular expression or dictionary of the first feature item can be obtained, and stratified sampling can be performed on the data corresponding to the field name. The obtained regular expression or dictionary is matched with the sampled data to obtain a matching rate between the regular expression or dictionary and the data corresponding to the field name, and then the obtained matching rate is compared with a preset matching rate threshold. If the matching rate is greater than the matching rate threshold, it is determined that the first feature item matches the data corresponding to the field name; otherwise, it is determined that the first feature item does not match the data corresponding to the field name.

In another example, when determining whether the first feature item matches the data corresponding to the field name according to the regular expression and/or dictionary of the first feature item, the regular expression of the first feature item can be first obtained. When the regular expression is obtained, the data corresponding to the field name is sampled in layers, the obtained regular expression is matched with the sampled data to obtain the matching rate between the regular expression and the data corresponding to the field name, and then the obtained matching rate is compared with a preset matching rate threshold. If the matching rate is greater than the matching rate threshold, it is determined that the first feature item matches the data corresponding to the field name, otherwise, it is determined that the first feature item does not match the data corresponding to the field name. When the regular expression is not obtained, the dictionary of the first feature item is obtained again, the data corresponding to the field name is sampled in layers, and then the obtained dictionary is matched with the sampled data to obtain the matching rate between the dictionary and the data corresponding to the field name, and then the matching rate is compared with the preset matching rate threshold. If the matching rate is greater than the matching rate threshold, it is determined that the first feature item matches the data corresponding to the field name, otherwise, it is determined that the first feature item does not match the data corresponding to the field name.

The matching rate between the regular expression and the data corresponding to the field name refers to the ratio of the amount of data in the sampled data that matches the regular expression to the total amount of data sampled. For example, if 10 words are sampled from the data corresponding to the field name, and 8 of them match the regular expression, the matching rate is 0.8. The matching rate between the dictionary and the data corresponding to the field name refers to the ratio of the amount of data in the sampled data that matches the dictionary to the total amount of data sampled. For example, if 10 words are sampled from the data corresponding to the field name, and 8 of them match the dictionary, the matching rate is 0.8. The matching rate threshold can be set according to the actual situation.

S45. In response to the first feature item matching the data corresponding to the field name, determining that the first sensitive data rule is a sensitive data rule that matches the structured data. In this embodiment, when performing sensitive data identification on structured data, the method of first identifying the sensitive field and then verifying the sampled data under the field can reduce the global search for real data in the structured data, thereby reducing data processing pressure and improving the speed of sensitive data identification.

In some embodiments, based on what is shown in FIG. 4, as shown in FIG. 5, the specific implementation of the above step S12 may further include the following steps S51 to S55.

S51. In response to not finding the first sensitive data rule in the sensitive data rule library, or the first feature item does not match the data corresponding to the field name, dividing the data corresponding to the field name into data to be detected and verification data.

In one example, when dividing the data corresponding to the field name into data to be detected and verification data, a sampling threshold can be set. When the number of rows of the data corresponding to the field name is less than the sampling threshold, the data corresponding to the field name is divided into two parts, one part as the data to be detected and the other part as the verification item. When the number of rows of the data corresponding to the field name is greater than the sampling threshold, stratified sampling is performed on the data corresponding to the field name, and the stratified sampled data is used as the data to be detected, and random sampling is performed on the data corresponding to the field name, and the randomly sampled data is used as the verification data.

S52. Matching the regular expressions and/or dictionaries of the feature items of all sensitive data rules in the sensitive data rule library with the data to be detected respectively to determine whether there are feature items that match the data to be detected.

The regular expression and/or dictionary of each feature item may be obtained from the feature item library.

For each feature item, the manner in which its regular expression and/or dictionary is matched with the data to be detected is consistent with the matching manner adopted in the above step S44, which will not be described in detail here. The matching rate between the regular expression or dictionary of each feature item and the data to be detected is obtained through matching, and the feature item with a matching rate greater than the matching rate threshold is regarded as the feature item that matches the data to be detected.

S53. In response to the presence of a feature item that matches the data to be detected, using the feature item that matches the data to be detected as a second feature item.

S54. Matching the regular expression and/or dictionary of the second feature item with the verification data to determine whether the second feature item matches the verification data.

Similarly, the manner in which the regular expression and/or dictionary of the second feature item is matched with the verification data is also consistent with the manner in the above-mentioned step S44, which will not be repeated here. The matching rate between the regular expression and dictionary of the second feature item and the verification data can be obtained. If the matching rate is greater than the matching rate threshold, it is determined that the second feature item matches the verification data; otherwise, it is determined that the second feature item does not match the verification data.

S55. In response to the second feature item matching the verification data, determining that the sensitive data rule to which the second feature item belongs is a sensitive data rule that matches the structured data.

In this embodiment, when it is impossible to match the sensitive data rules that match the structured data based on the field name, rather than directly determining that the structured data does not contain sensitive data, a matching sensitive data rule is further searched through the data corresponding to the field name. In this way, the accuracy of recognition can be improved.

In some embodiments, in order to further improve the recognition accuracy, when the second feature item matches the verification data, before determining that the sensitive data rule to which the second feature item belongs matches the structured data, the following steps may be further performed:

obtaining a checksum of the second feature item, and further checking the data to be identified by using the checksum. If the check passes, the sensitive data rule to which the second feature item belongs is determined to be a sensitive data rule that matches the structured data.

In some embodiments, considering that the format of the extracted field names may not be standardized and may contain some descriptive text, it may result in the above-mentioned recognition method for structured data being unable to identify the sensitive data rules that match the structured data from the sensitive data rule library. In this case, in order to further improve the recognition accuracy, the trained named-entity recognition model can be used to extract feature items in the structured data, and then sensitive data recognition can be performed based on the extracted feature items using manual verification.

The above is a method for searching for sensitive data rules that match the structured data in the data to be identified from the sensitive data rule library. After the sensitive data rules that match the structured data are determined in the above method, the sensitive information of the structured data can be determined according to the determined sensitive data rules. Accordingly, the specific implementation of the above step S13 may include:

in response to there being only one sensitive data rule matching the structured data in the sensitive data rule library, using the sensitive classification and sensitivity level included in the sensitive data rule matching the structured data as the sensitive classification and sensitivity level of the structured data;

in response to the presence of multiple sensitive data rules matching the structured data in the sensitive data rule library, using the sensitive classification and sensitivity level included in the sensitive data rule with the highest sensitivity level among the multiple sensitive data rules matching the structured data as the sensitive classification and sensitivity level of the structured data.

In one example, when searching for sensitive data rules that match structured data from a sensitive data rule library, a method of searching one by one is adopted. When a sensitive data rule that matches the structured data is found, the sensitive data rule and the sensitive classification and sensitivity level contained in the sensitive data rule are recorded as the sensitive information of the structured data. When other sensitive data rules that match the structured data are found subsequently, the sensitivity level of the other sensitive data rules found is compared with the sensitivity level recorded previously. If the sensitivity level of the other sensitive data rules found subsequently is higher than the recorded sensitivity level, the sensitive information of the structured data is updated to the other sensitive data rules found subsequently and the sensitive classification and sensitivity level of the other sensitive data rules. Otherwise, the recorded sensitive information remains unchanged.

Through this embodiment, when there are multiple sensitive data rules that match the structured data, the sensitive information of the structured data is determined according to the sensitive data rule with the highest sensitivity level, thereby ensuring the accuracy of the sensitive information finally determined.

The following describes how to find sensitive data rules that match unstructured data.

In some embodiments, as shown in FIG. 6, the specific implementation of the above step S12 may also include the following steps S61 to S68.

S61. Obtaining unstructured data from the data to be identified.

In one example, other data except structured data in the data to be identified is extracted as unstructured data.

S62. Performing word segmentation processing on the unstructured data to obtain word segmentation results of the unstructured data.

Existing mature text segmentation technology can be used to perform word segmentation on unstructured data to obtain corresponding word segmentation results.

S63. Using all sensitive words in the sensitive data rule library to perform full-text matching on the unstructured data after word segmentation to determine the sensitive words in the sensitive data rule library that match the unstructured data.

Each sensitive word is fully matched with the unstructured data. If there is a word consistent with the sensitive word in the unstructured data, it is determined that the sensitive word matches the unstructured data.

S64. In response to the existence of sensitive words matching the unstructured data in the sensitive data rule library, using the sensitive words matching the unstructured data as target sensitive words, and using the sensitive data rule to which the target sensitive word belongs as the target sensitive data rule.

S65. Recording the location of the target sensitive word in the unstructured data.

S66. Extracting N characters before and after the location in the unstructured data, where N is a positive integer.

The value of N can be set according to actual conditions.

In one example, characters may be taken before and after the location corresponding to the target sensitive word, for a total of N characters, and then the N characters taken are used as content to be identified and further identified using target sensitive data rules.

S67. Matching the regular expression and/or dictionary of the feature item of the target sensitive data rule with the N characters to determine whether the feature item of the target sensitive data rule matches the N characters.

S68. In response to the feature item of the target sensitive data rule matching the N characters, determining that the target sensitive data rule is a sensitive data rule that matches the unstructured data.

In this embodiment, the method is to identify sensitive data in unstructured data to be identified. During identification, sensitive words are first used to locate the content to be identified, and then only the content to be identified is matched and identified with the target sensitive data rules. In this way, there is no need to match all unstructured data with sensitive data rules, which reduces the workload required for identification and improves identification efficiency.

In some embodiments, considering that there may be no sensitive words in the unstructured data, as shown in FIG. 7, the specific implementation of the above step S12 may also include the following steps S71 to S73.

S71. Using the dictionary of all feature items in the sensitive data rule library and/or the trained named-entity recognition model to identify feature items in the unstructured data as the third feature items.

In one example, a dictionary of all feature items can be obtained from a feature item library. After obtaining the dictionary, each feature contained in the dictionary can be fully matched with the unstructured data, so that the features matching the unstructured data are used as feature items of the unstructured data. In this way, only simple text matching is required to quickly identify the feature items of the unstructured data.

In one example, a Named Entity Recognition (referred to as NER model) is constructed by combining a bidirectional long short-term memory network (Bi-LSTM) and a conditional random field (CRF), as shown in FIG. 8, which is a schematic diagram of a named-entity recognition model provided by an embodiment of the present disclosure. Bi-LSTM relies on the nonlinear fitting ability of a neural network. When training a named-entity recognition model, the sample is subjected to complex nonlinear changes in a high-dimensional space, the features of the function from the sample to the annotation are extracted, and a named entity library and a corresponding label knowledge base are constructed. CRF can express the dependency between observations, and can also express the complex dependency between the current observation and multiple states before and after. CRF uses the output results of Bi-LSTM, text labels, and matrices in a neural network as input parameters, and uses a state transition matrix to constrain some labels with obvious errors, such as "O cannot be directly followed by I", "B cannot be followed by O", etc., where I, O, and B all represent labels. After multiple iterations of training, the model parameters are optimized to obtain a trained named-entity recognition model.

By inputting unstructured data into a trained named-entity recognition model, the model outputs sensitive features of the entity properties in the unstructured data, that is, the feature items of the unstructured data. In this way, more accurate and comprehensive feature items can be identified.

Among them, feature items may include name, brand name, product name, organization name, address, date, etc.

S72. Searching the sensitive data rules containing the third feature item from the sensitive data rule library as the third sensitive data rules.

S73. In response to finding the third sensitive data rules from the sensitive data rule library, determining a sensitive data rule that matches the unstructured data from the third sensitive data rules.

In this embodiment, the sensitive data rule base and the named-entity recognition model are combined to identify sensitive features with entity properties in unstructured data, making up for the shortcomings of the sensitive data rule base in identifying unstructured data, thereby realizing sensitive data recognition based on the sensitive data rule base for unstructured data.

In some embodiments, considering that when identifying unstructured data, multiple third sensitive data rules containing the third feature item may be identified based on the third feature item, for example, the third feature item of the unstructured data includes "date", and there may be many sensitive data rules involving date in the sensitive data rule library. In this case, in order to improve the recognition accuracy, it is necessary to further clarify which sensitive data rule the third feature item specifically belongs to. In view of this, determining the sensitive data rule that matches the unstructured data based on the third sensitive data rule may include:

in response to the presence of multiple third sensitive data rules in the sensitive data rule library, performing a semantic classification processing on the unstructured data to obtain the sensitive classification to which the unstructured data belongs. For example, in the financial industry, multiple rules corresponding to the feature item "date" may belong to different classifications such as basic personal information and basic account information;

using multiple sensitive data rules whose sensitive classifications in the third sensitare consistent with the sensitive classifications to which the unstructured data belongs as sensitive data rules that match the unstructured data.

Correspondingly, if there is only one third sensitive data rule in the sensitive data rule library, the third sensitive data rule can be directly used as the sensitive data rule that matches the unstructured data, or the third sensitive data rule can be first verified based on the sensitive classification to which the unstructured data belongs, and then the third sensitive data rule can be used as the sensitive data rule that matches the unstructured data if it is determined that the sensitive classification of the third sensitive data rule is consistent with the sensitive classification to which the unstructured data belongs.

Among them, when performing semantic classification processing on unstructured data, mature text classification technology can be used to classify the unstructured data based on the data security specification text of the target industry.

In one example, taking the target industry as the financial industry, RNN+ALBERT can be used to perform text classification processing on unstructured data according to the secondary subclass of the "Financial Data Security Classification Guidelines" to obtain the classification results of unstructured data. Because the sensitive data rules are also set based on the data security specification text, the determination method of the sensitive classification contained therein is consistent with this classification method, so that the classification results obtained by classification can correspond to the sensitive classification in the sensitive data rules. In this way, the sensitive data rules can be filtered based on the classification results. In this embodiment, the third sensitive data rules are filtered based on the sensitive classification to which the unstructured data belongs to determine the sensitive data rules that match the unstructured data, which can improve the accuracy of sensitive data identification.

In some embodiments, in order to further improve the accuracy of recognition, after step S12, the data to be recognized may be manually verified, where the manual verification may adopt an existing mature verification method.

The above is a method for searching for sensitive data rules that match the unstructured data in the data to be identified from the sensitive data rule library. After the sensitive data rules that match the unstructured data are determined in the above method, the sensitive information of the unstructured data can be determined according to the determined sensitive data rules. Accordingly, the specific implementation method of the above step S13 may include:

in response to there being only one sensitive data rule matching the unstructured data in the sensitive data rule library, using the sensitive classification and sensitivity level included in the sensitive data rule matching the unstructured data as the sensitive classification and sensitivity level of the unstructured data;

in response to the presence of multiple sensitive data rules matching unstructured data in a sensitive data rule library, using the sensitive classification and sensitivity level included in a sensitive data rule with the highest sensitivity level among the multiple sensitive data rules matching unstructured data as the sensitive classification and sensitivity level of the unstructured data.

When searching for sensitive data rules that match unstructured data from the sensitive data rule library, a method of searching one by one is adopted. When a sensitive data rule that matches the unstructured data is found, the sensitive data rule and the sensitive classification and sensitivity level contained in the sensitive data rule are recorded as the sensitive information of the unstructured data. When other sensitive data rules that match the unstructured data are found subsequently, the sensitivity level of the other sensitive data rules found is compared with the sensitivity level recorded previously. If the sensitivity level of the other sensitive data rules found subsequently is higher than the sensitivity level recorded, the sensitive information of the unstructured data is updated to the other sensitive data rules found subsequently and the sensitive classification and sensitivity level of the other sensitive data rules. Otherwise, the recorded sensitive information remains unchanged.

Through this embodiment, when there are multiple sensitive data rules matching unstructured data, the sensitive information of the unstructured data is determined according to the sensitive data rule with the highest sensitivity level, thereby ensuring the accuracy of the sensitive information finally determined.

Figure 9:
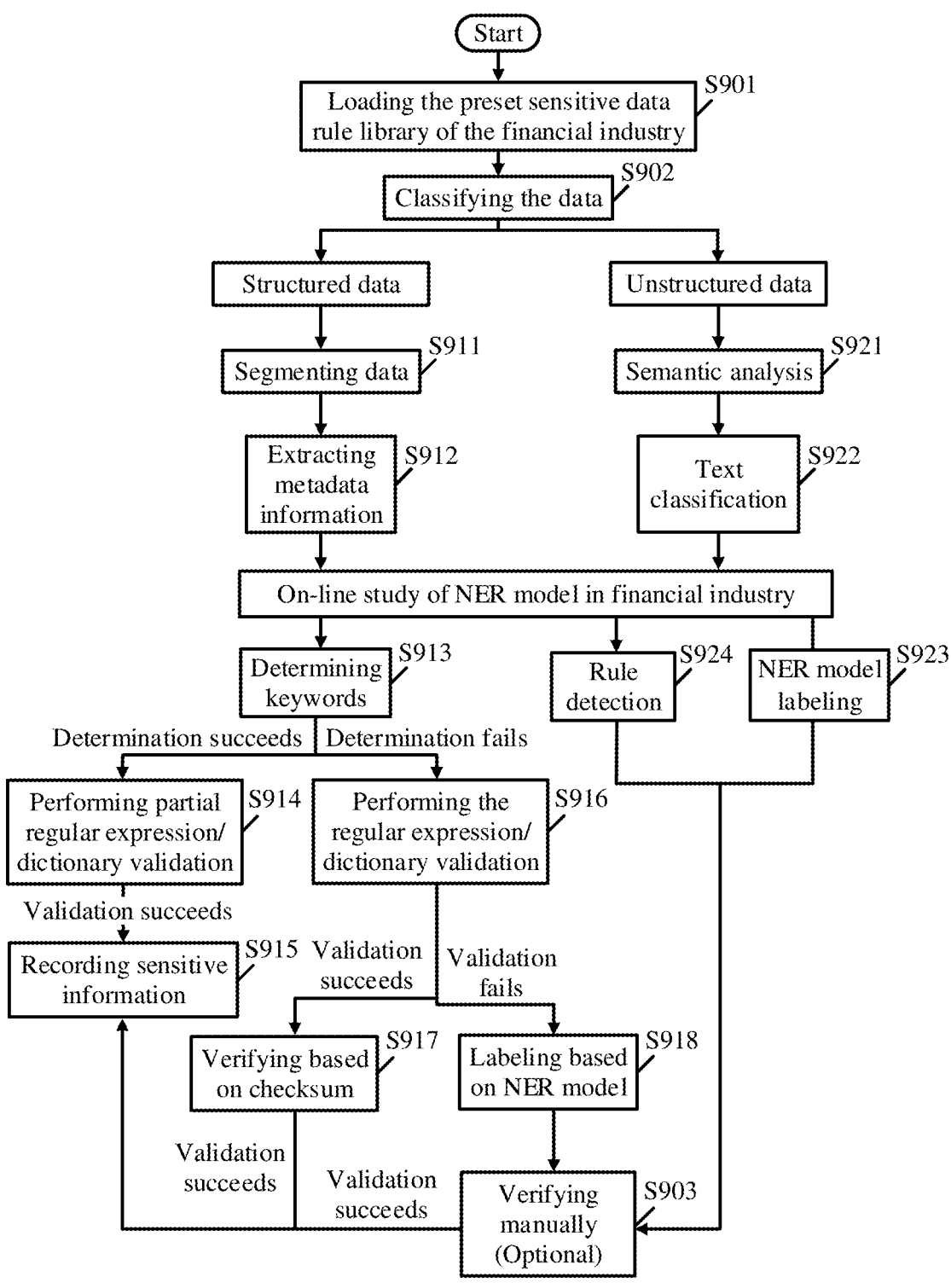
FIG. 9 is a flowchart of a sensitive data identification method provided by an embodiment of the present disclosure.

Referring to FIG. 9, which is a schematic diagram of the overall process of sensitive data identification provided by an embodiment of the present disclosure. As shown in FIG. 9, the following steps can be performed when performing sensitive data identification:

S901. Loading the preset sensitive data rule library of the target industry;

S902. Classifying the data to be identified into structured data and unstructured data.

For the structured data, perform the following steps:

S911. Segmenting data;

S912. Extracting metadata information.

The metadata information extraction is to extract the field name to be identified and the data corresponding to the field name.

S913. Determining keywords. If the keyword determination is successful, executing S914; if the keyword determination fails, executing S916.

The keyword determination is to search for sensitive data rules whose keywords match the field names in the sensitive data rule library. If the keyword determination is successful, it means that the sensitive data rules matching the field names are found. If the keyword determination fails, it means that the sensitive data rules matching the field names are not found.

S914. Performing partial regular expression/dictionary validation, and executing S915 if the validation succeeds.

That is, only the regular expression/dictionary corresponding to the sensitive data rule matching the field name is used to match and verify the sampled data corresponding to the field name.

S915. Recording sensitive information.

S916. Performing the regular expression/dictionary validation. If the validation is successful, executing S917; if the validation fails, executing S918.

That is, the regular expressions/dictionaries of all feature items in the sensitive data rule library are used to match the data corresponding to the field name, and the sensitive data rules that match the data corresponding to the field name are found. If the verification is successful, the sensitive data rules that match the data corresponding to the field name are found.

S917. Verifying based on checksum, and if the verification is successful, executing S919.

That is, the data corresponding to the field name is further verified by using the checksum of the feature items in the sensitive data rules found.

S918. Labeling based on NER model.

That is, the trained NER model is used to determine the feature items of structured data.

S903. Verifying manually.

For unstructured data, performing the following steps.

S921. Semantic analysis.

That is, the unstructured data is segmented to obtain the segmentation result.

S922. Text classification.

That is to classify the unstructured data and obtain the classification result.

S923. NER model labeling.

That is to say, feature items in unstructured data are extracted through the trained NER model.

S924. Rule detection.

That is, based on the feature items in the extracted unstructured data, the sensitive data rules that match the feature items are searched from the sensitive data rule library.

After completing the sensitive data identification of the unstructured data through S923 and S924, a manual verification can be further performed through S903.

In addition to the above steps, as shown in FIG. 9, after S912 and S922, the NER model may be learned online to improve the model accuracy.

It should be noted that sensitive data identification can be performed in parallel for structured data and unstructured data.

Figure 10:
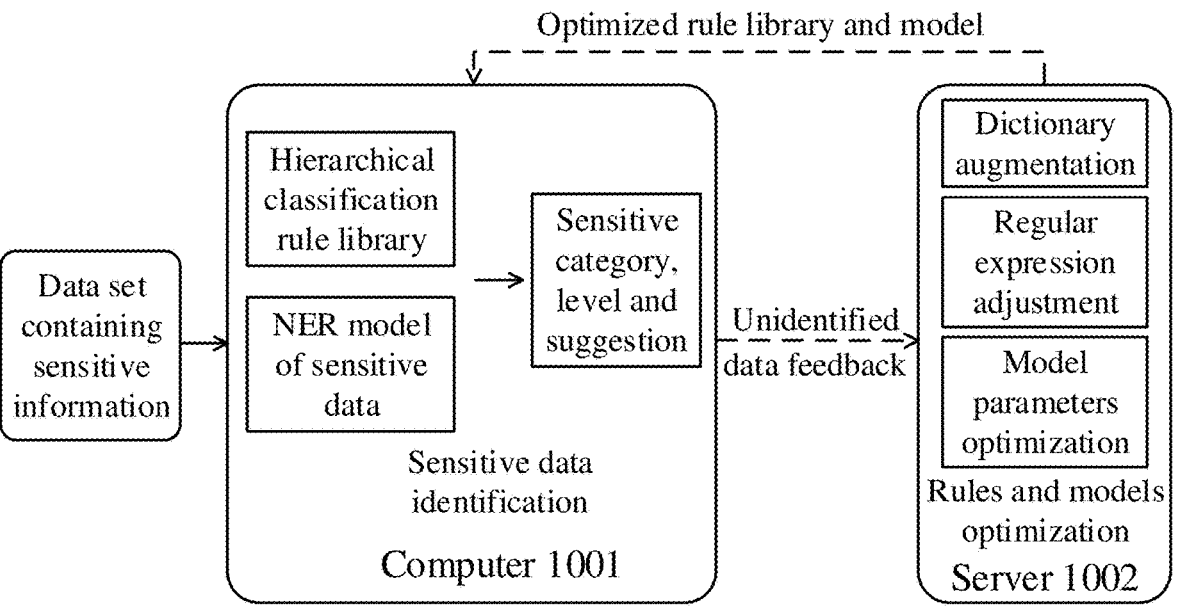
FIG. 10 is a schematic diagram of a sensitive data identification system provided by an embodiment of the present disclosure.

Refer to FIG. 10, which is a schematic diagram of the design of a sensitive data identification system provided in an embodiment of the present disclosure. As shown in FIG. 10, the system may include a local computer 1001 and a server 1002.

Among them, computer 1001 is configured to perform sensitive data identification on the data to be identified. The computer 1001 only needs to store the sensitive data rule library and the trained NER model. The maintenance of the sensitive data rule library (including the maintenance of regular expressions), augmentation, and NER model optimization can be completed by the remote server 1002, thereby reducing the space occupied by the system and ensuring the operating efficiency of the data system.

A sensitive data identification method and system provided in this embodiment comprehensively utilizes the sensitive data rule library and NER model of the target industry to effectively identify sensitive information in structured data and unstructured data, and solve problems such as limited sensitive data rules, inconsistent naming of sensitive words, and low recognition accuracy.

Based on the sensitive data identification method provided in the above embodiment, the present disclosure also provides a specific implementation of the sensitive data identification device.

Figure 11:
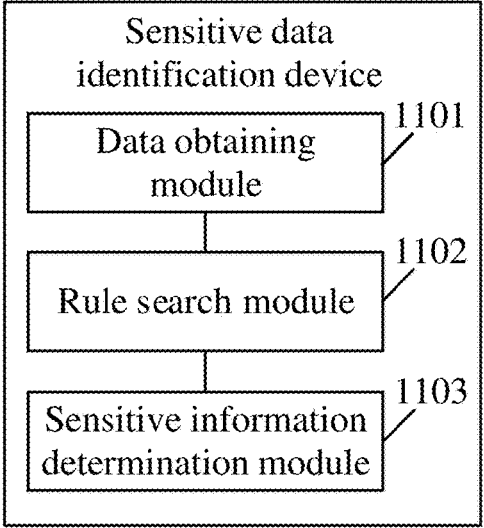
FIG. 11 is a schematic diagram of the structure of a sensitive data identification device provided by an embodiment of the present disclosure.

Referring to FIG. 11, which is a schematic diagram of the structure of a sensitive data identification device provided in an embodiment of the present disclosure, as shown in FIG. 11, a sensitive data identification device provided in this embodiment may include the following modules:

a data obtaining module 1101 configured to acquire the data to be identified in the target industry;

a rule search module 1102 configured to search for sensitive data rules that match the data to be identified in the sensitive data rule library corresponding to the target industry; the sensitive data rule library includes multiple sensitive data rules mined from the data security specification files of the target industry using text mining technology;

a sensitive information determination module 1103 configured to determine the sensitive information of the data to be identified according to the sensitive data rules in the sensitive data rule base that match the data to be identified.

A sensitive data identification device provided in an embodiment of the present disclosure uses text mining technology to mine multiple sensitive data rules from the data security specification file of the target industry to form a sensitive data rule library. After obtaining the data to be identified in the target industry, the sensitive data rule library corresponding to the target industry is searched for sensitive data rules that match the data to be identified, and the sensitive information of the data to be identified is determined according to the matched sensitive data rules. According to an embodiment of the present disclosure, the sensitive data rule library corresponding to the industry obtained by text mining the data security specification file in the industry is applicable to all enterprises and individuals in the industry. Compared with artificially formulated enterprise-level data products, it has a wider scope of application, universality and broader application prospects, and higher compliance, making industry standards technically executable.

In some embodiments, the above apparatus may further include: a rule base construction module, specifically configured to:

before checking whether the sensitive data rule library corresponding to the target industry has sensitive data rules matching the data to be identified, obtain the data security specification file of the target industry;

use text mining technology to mine multiple sensitive data rules from the obtained data security specification files, where each sensitive data rule includes the values of the following parameters: rule name, sensitive classification, sensitivity level, feature item, sensitive word and keyword; each feature item further includes the values of the following parameters: feature item name, regular expression for identifying the feature item, dictionary and checksum;

combine multiple sensitive data rules into a sensitive data rule library corresponding to the target industry;

combine the values of the parameter items included in the multiple feature items in the sensitive data rule library into a feature item library corresponding to the sensitive data rule library.

In some embodiments, the above device may further include: an augmentation module, specifically configured to:

before detecting whether there is a sensitive data rule matching the data to be identified in the sensitive data rule library corresponding to the target industry, for each sensitive data rule in the sensitive data rule library, perform augmentation processing on the parameter values of the keywords and the parameter values of the sensitive words in the sensitive data rule to obtain synonyms of the parameter values, and add the synonyms to the keywords and sensitive words in the sensitive data rule; and/or, for each sensitive data rule in the sensitive data rule base, augment the parameter value in the feature item in the sensitive data rule to obtain synonyms and/or congeneric words of the parameter value, and combine the synonyms and/or congeneric words into a dictionary of the feature item.

In some embodiments, the rule search module 1102 is specifically configured to:

obtain structured data from the data to be identified;

extract the field names to be identified and the data corresponding to the field names in the structured data;

search for a sensitive data rule whose keyword matches the field name from the sensitive data rule library as the first sensitive data rule;

in response to finding the first sensitive data rule from the sensitive data rule library, determining whether the first feature item matches the data corresponding to the field name according to a regular expression and/or dictionary preset in the first feature item, the first feature item is a feature item of the first sensitive data rule;

in response to the first feature item matching the data corresponding to the field name, determining the first sensitive data rule to be a sensitive data rule that matches the structured data.

In some embodiments, the rule search module 1102 may also be configured to:

in response to not finding the first sensitive data rule in the sensitive data rule library, or the first feature item does not match the data corresponding to the field name, divide the data corresponding to the field name into data to be detected and verification data;

match the regular expressions and/or dictionaries of the feature items of all sensitive data rules in the sensitive data rule library with the data to be detected respectively to determine whether there is a feature item matching the data item to be detected;

in response to the presence of a feature item that matches the data to be detected, take the feature item that matches the data to be detected as a second feature item;

match the regular expression and/or dictionary of the second feature item with the verification data to determine whether the second feature item matches the verification data;

in response to the second feature item matching the verification data, determine that the sensitive data rule to which the second feature item belongs is a sensitive data rule that matches the structured data.

In some embodiments, the sensitive information determination module 1103 is specifically configured to:

in response to there being only one sensitive data rule matching the structured data in the sensitive data rule library, using the sensitive classification and sensitivity level included in the sensitive data rule matching the structured data as the sensitive classification and sensitivity level of the structured data;

in response to the presence of multiple sensitive data rules matching the structured data in the sensitive data rule library, using the sensitive classification and sensitivity level included in the sensitive data rule with the highest sensitivity level among the multiple sensitive data rules matching the structured data as the sensitive classification and sensitivity level of the structured data.

In some embodiments, the rule search module 1102 may also be configured to:

obtain unstructured data from the data to be identified;

perform word segmentation processing on unstructured data to obtain word segmentation results of unstructured data;

use all sensitive words in the sensitive data rule library to perform full-text matching on the unstructured data after the word segmentation processing to determine whether there are sensitive words in the sensitive data rule library that match the unstructured data;

in response to the presence of a sensitive word matching the unstructured data in the sensitive data rule library, use the sensitive word matching the unstructured data as a target sensitive word, and use the sensitive data rule to which the target sensitive word belongs as a target sensitive data rule;

record the location of the target sensitive word in unstructured data;

extract N characters before and after the location in the unstructured data, where N is a positive integer;

match the regular expression and/or dictionary of the feature item of the target sensitive data rule with the N characters to determine whether the feature item of the target sensitive data rule matches the N characters;

in response to the feature item of the target sensitive data rule matching the N characters, determine the target sensitive data rule to be a sensitive data rule that matches the unstructured data.

In some embodiments, the rule search module 1102 may also be configured to:

use a dictionary of all feature items in a sensitive data rule base and/or a trained named-entity recognition model to identify a feature item in the unstructured data as a third feature item;

search a sensitive data rule including the third feature item from a sensitive data rule library as a third sensitive data rule;

in response to finding the third sensitive data rule from the sensitive data rule library, determine a sensitive data rule that matches the unstructured data from the third sensitive data rule. In some embodiments, determining a sensitive data rule that matches the unstructured data from the third sensitive data rule includes:

in response to the presence of a plurality of third sensitive data rules in the sensitive data rule library, performing a semantic classification processing on the unstructured data to obtain a sensitive classification to which the unstructured data belongs;

using the sensitive data rules whose sensitive classifications among the multiple third sensitive data rules are consistent with the sensitive classifications to which the unstructured data belongs as sensitive data rules that match the unstructured data.

In some embodiments, the sensitive information determination module 1103 is specifically configured to:

in response to there being only one sensitive data rule matching the unstructured data in the sensitive data rule library, use the sensitive classification and sensitivity level included in the sensitive data rule matching the unstructured data as the sensitive classification and sensitivity level of the unstructured data;

in response to the presence of multiple sensitive data rules matching unstructured data in a sensitive data rule library, using the sensitive classification and sensitivity level included in a sensitive data rule with the highest sensitivity level among the multiple sensitive data rules matching unstructured data as the sensitive classification and sensitivity level of the unstructured data.

The sensitive data identification device provided in the embodiment of the present disclosure can implement each process implemented by any of the above-mentioned sensitive data identification method embodiments. To avoid repetition, they will not be described here.

Figure 12:
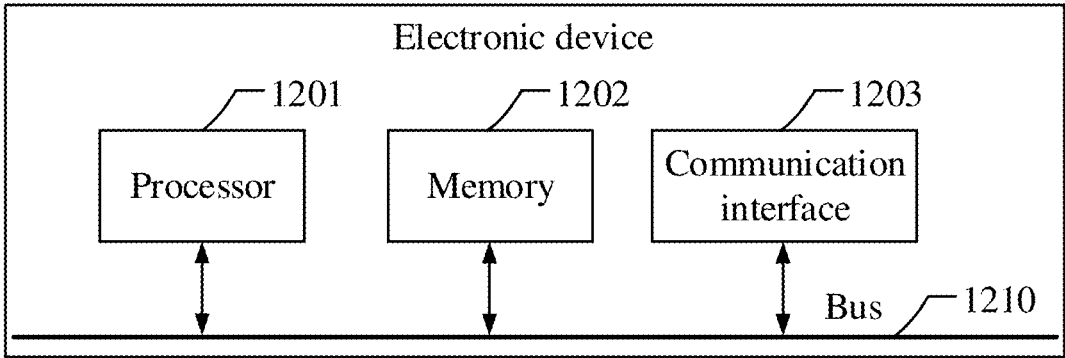
FIG. 12 is a schematic diagram of the structure of an electronic device provided by an embodiment of the present disclosure.

FIG. 12 shows a schematic diagram of the hardware structure of an electronic device provided in an embodiment of the present disclosure.

The electronic device may include a processor 1201 and a memory 1202 storing computer program instructions.

Specifically, the processor 1201 may include a Central Processing Unit (CPU), or an Application Specific Integrated Circuit (ASIC), or may be configured to implement one or more integrated circuits of the embodiments of the present disclosure.

The memory 1202 may include a large capacity memory for data or instructions. By way of example and not limitation, the memory 1202 may include a Hard Disk Drive (HDD), a floppy disk drive, a flash memory, an optical disk, a magneto-optical disk, a magnetic tape, or a Universal Serial Bus (USB) drive, or a combination of two or more of these. Where appropriate, the memory 1202 may include a removable or non-removable (or fixed) medium. Where appropriate, the memory 1202 may be inside or outside the integrated gateway disaster recovery device. In a particular embodiment, the memory 1202 is a non-volatile solid-state memory.

The memory 1202 may include a Read-Only Memory (ROM), a Random Access Memory (RAM), a magnetic disk storage medium device, an optical storage medium device, a flash memory device, an electrical, optical or other physical/tangible memory storage device. Therefore, typically, the memory 1202 includes one or more tangible (non-transitory) computer-readable storage media (e.g., a memory device) encoded with software including computer-executable instructions, and when the software is executed (e.g., by one or more processors), it can perform the operations described in any of the sensitive data identification methods in the above embodiments.

The processor 1201 implements any sensitive data identification method in the above embodiments by reading and executing computer program instructions stored in the memory 1202.

In one example, the electronic device may further include a communication interface 1203 and a bus 1210. As shown in FIG. 12, the processor 1201, the memory 1202, and the communication interface 1203 are connected via the bus 1210 and communicate with each other.

The communication interface 1203 is mainly configured to implement communication between various modules, devices, units and/or equipment in the embodiments of the present disclosure.

The bus 1210 includes hardware, software or both, and the components of online data flow billing equipment are coupled to each other. For example, but not limitation, the bus may include accelerated graphics port (AGP) or other graphics bus, enhanced industrial standard architecture (EISA) bus, front-end bus (FSB), hypertransport (HT) interconnection, industrial standard architecture (ISA) bus, infinite bandwidth interconnection, low pin count (LPC) bus, memory bus, micro channel architecture (MCA) bus, peripheral component interconnection (PCI) bus, PCI-Express (PCI-X) bus, serial advanced technology attachment (SATA) bus, video electronics standard association local (VLB) bus or other suitable bus or two or more of these combinations.

In appropriate cases, the bus 1210 may include one or more buses. Although the present disclosure embodiment describes and shows a specific bus, the present disclosure considers any suitable bus or interconnection.

In addition, in combination with the sensitive data identification method in the above embodiments, the embodiments of the present disclosure may provide a computer storage medium for implementation. The computer storage medium stores computer program instructions. When the computer program instructions are executed by a processor, any sensitive data identification method in the above embodiments is implemented.

It should be clear that the present disclosure is not limited to the specific configuration and processing described above and shown in the figures. For the sake of simplicity, a detailed description of the known method is omitted here. In the above embodiments, several specific steps are described and shown as examples. However, the method process of the present disclosure is not limited to the specific steps described and shown, and those skilled in the art can make various changes, modifications and additions, or change the order between the steps after understanding the spirit of the present disclosure.

The functional blocks shown in the above-described block diagram can be implemented as hardware, software, firmware or a combination thereof. When implemented in hardware, it can be, for example, an electronic circuit, an application specific integrated circuit (ASIC), appropriate firmware, a plug-in, a function card, etc. When implemented in software, the elements of the present disclosure are programs or code segments that are used to perform the required tasks. The program or code segment can be stored in a machine-readable medium, or transmitted on a transmission medium or a communication link by a data signal carried in a carrier wave. "Machine-readable medium" can include any medium capable of storing or transmitting information. Examples of machine-readable media include electronic circuits, semiconductor memory devices, ROM, flash memory, erasable ROM (EROM), floppy disks, CD-ROMs, optical disks, hard disks, optical fiber media, radio frequency (RF) links, etc. The code segment can be downloaded via a computer network such as the Internet, an intranet, etc.

It should also be noted that the exemplary embodiments mentioned in this application describe some methods or systems based on a series of steps or devices. However, this application is not limited to the order of the above steps, that is, the steps can be performed in the order mentioned in the embodiments, or in a different order from the embodiments, or several steps can be performed simultaneously.

Aspects of the present disclosure are described above with reference to the flowcharts and/or block diagrams of the methods, devices (systems) and computer program products according to the embodiments of the present disclosure. It should be understood that each box in the flowchart and/or block diagram and the combination of each box in the flowchart and/or block diagram can be implemented by computer program instructions. These computer program instructions can be provided to a processor of a general-purpose computer, a special-purpose computer, or other programmable data processing device to produce a machine so that these instructions executed by the processor of the computer or other programmable data processing device enable the implementation of the function/action specified in one or more boxes of the flowchart and/or block diagram. Such a processor can be, but is not limited to, a general-purpose processor, a special-purpose processor, a special application processor, or a field programmable logic circuit. It can also be understood that each box in the block diagram and/or flowchart and the combination of boxes in the block diagram and/or flowchart can also be implemented by dedicated hardware that performs a specified function or action, or can be implemented by a combination of dedicated hardware and computer instructions.

The above is only a specific implementation of the present disclosure. Those skilled in the art can clearly understand that for the convenience and simplicity of description, the specific working processes of the systems, modules and units described above can refer to the corresponding processes in the aforementioned method embodiments, and will not be repeated here. It should be understood that the protection scope of the present disclosure is not limited to this. Any technician familiar with the technical field can easily think of various equivalent modifications or replacements within the technical scope disclosed in this disclosure, and these modifications or replacements should be included in the protection scope of this application.

What is claimed is:

1. A sensitive data identification method, comprising:
obtaining data to be identified of a target industry;
searching for a sensitive data rule matching the data to be
identified in a sensitive data rule library corresponding
to the target industry, wherein the sensitive data rule
library comprises a plurality of sensitive data rules
mined from a data security specification file of the
target industry by using a text mining technology;
determining sensitive information of the data to be identified according to the sensitive data rule matching the
data to be identified in the sensitive data rule library;
wherein before the searching for the sensitive data rule
matching the data to be identified in the sensitive data
rule library corresponding to the target industry, the
method further comprises:
obtaining the data security specification file of the target
industry;
mining the plurality of sensitive data rules from the data
security specification file by using the text mining
technology, wherein each of the sensitive data rules
comprises parameter values of following parameters: a
rule name, a sensitive classification, a sensitivity level,
a feature item, a sensitive word and a keyword; the
feature item comprises following parameters: a feature
item name, a regular expression for identifying the
feature item, a dictionary and a checksum;
combining the plurality of sensitive data rules into the
sensitive data rule library corresponding to the target
industry;
combining the parameters comprised by feature items in
the sensitive data rule library into a feature item library
corresponding to the sensitive data rule library;
wherein the searching for the sensitive data rule matching
the data to be identified in the sensitive data rule library
corresponding to the target industry, comprises:
obtaining structured data from the data to be identified;
extracting a field name to be identified in the structured
data and data corresponding to the field name;
searching for a sensitive data rule whose keyword
matches the field name from the sensitive data rule
library as a first sensitive data rule;
in response to finding the first sensitive data rule from the
sensitive data rule library, determining whether a first
feature item matches the data corresponding to the field
name according to a regular expression and/or a dictionary preset in the first feature item, wherein the first feature item is a feature item of the first sensitive data rule;

in response to the first feature item matching the data corresponding to the field name, determining that the first sensitive data rule is a sensitive data rule matching the structured data.

2. The method according to claim 1, wherein before the searching for the sensitive data rule matching the data to be identified in the sensitive data rule library corresponding to the target industry, the method further comprises:

for each sensitive data rule in the sensitive data rule library, augmenting parameter values of the keyword and the sensitive word in the each sensitive data rule to obtain synonyms of the parameter values, and add the synonyms to the keyword and the sensitive word in the each sensitive data rule; and/or, for each sensitive data rule in the sensitive data rule library, augmenting parameter values of the parameters comprised by the feature item in the each sensitive data rule to obtain synonyms and/or congeneric words of the parameter values, and combining the synonyms and/or the congeneric words into a dictionary of the feature item.

3. The method according to claim 1, wherein the searching for the sensitive data rule matching the data to be identified in the sensitive data rule library corresponding to the target industry, further comprises:

in response to not finding the first sensitive data rule from the sensitive data rule library, or the first feature item not matching the data corresponding to the field name, dividing the data corresponding to the field name into data to be detected and verification data;

comparing regular expressions and/or dictionaries of feature items of all sensitive data rules in the sensitive data rule library with the data to be detected respectively to determine whether there is a feature item matching the data to be detected;

in response to a presence of a feature item matching the data to be detected, taking the feature item matching the data to be detected as a second feature item;

comparing a regular expression and/or a dictionary of the second feature item with the verification data to determine whether the second feature item matches the verification data;

in response to the second feature item matching the verification data, determining that the sensitive data rule to which the second feature item belongs is the sensitive data rule matching the structured data.

4. The method according to claim 3, wherein the determining the sensitive information of the data to be identified according to the sensitive data rule matching the data to be identified in the sensitive data rule library, comprises:

in response to there being only one sensitive data rule matching the structured data in the sensitive data rule library, using the sensitive classification and the sensitivity level of the sensitive data rule matching the structured data as the sensitive classification and the sensitivity level of the structured data;

in response to there being a plurality of sensitive data rules matching the structured data in the sensitive data rule library, using the sensitive classification and the sensitivity level of a sensitive data rule with a highest sensitivity level among the sensitive data rules matching the structured data as the sensitive classification and the sensitivity level of the structured data.

5. The method according to claim 1, wherein the searching for the sensitive data rule matching the data to be identified in the sensitive data rule library corresponding to the target industry, comprises:

obtaining unstructured data from the data to be identified;

performing a word segmentation processing on the unstructured data to obtain a word segmentation result of the unstructured data;

performing a full-text matching on the unstructured data after the word segmentation processing by using all sensitive words in the sensitive data rule library to determine a sensitive word matching the unstructured data in the sensitive data rule library;

in response to the sensitive word matching the unstructured data in the sensitive data rule library, using the sensitive word matching the unstructured data as a target sensitive word, and using the sensitive data rule to which the target sensitive word belongs as a target sensitive data rule;

recording a location of the target sensitive word in the unstructured data;

extracting N characters located before and after the location in the unstructured data, wherein N is a positive integer;

comparing a regular expression and/or a dictionary of a feature item of the target sensitive data rule with the N characters to determine whether the feature item of the target sensitive data rule matches the N characters;

in response to the feature item of the target sensitive data rule matching the N characters, determining that the target sensitive data rule is a sensitive data rule matching the unstructured data.

6. The method according to claim 5, wherein the searching for the sensitive data rule matching the data to be identified in the sensitive data rule library corresponding to the target industry, comprises:

using dictionaries of all feature items in the sensitive data rule library and/or a trained named-entity recognition model to identify a feature item in the unstructured data as a third feature item;

searching a sensitive data rule comprising the third feature item from the sensitive data rule library as a third sensitive data rule;

in response to finding the third sensitive data rule from the sensitive data rule library, determining a sensitive data rule matching the unstructured data from the third sensitive data rule.

7. The method according to claim 6, wherein the determining the sensitive data rule matching the unstructured data from the third sensitive data rule, comprises:

in response to a presence of a plurality of third sensitive data rules in the sensitive data rule library, performing a semantic classification processing on the unstructured data to obtain the sensitive classification to which the unstructured data belongs;

determining that among the plurality of third sensitive data rules, a sensitive data rule whose sensitive classification is consistent with the sensitive classification to which the unstructured data belongs is the sensitive data rule matching the unstructured data.

8. The method according to claim 5, wherein the determining the sensitive information of the data to be identified according to the sensitive data rule matching the data to be identified in the sensitive data rule library, comprises:

in response to there being only one sensitive data rule matching the unstructured data in the sensitive data rule library, using the sensitive classification and the sensitivity level of the sensitive data rule matching the unstructured data as the sensitive classification and the sensitivity level of the unstructured data;

in response to there being a plurality of sensitive data rules matching the unstructured data in the sensitive data rule library, using the sensitive classification and the sensitivity level of a sensitive data rule with a highest sensitivity level among the plurality of sensitive data rules matching the unstructured data as the sensitive classification and the sensitivity level of the unstructured data.

\* \* \* \* \*